Aug. 26, 1969    M. T. WORKS    3,463,450

FABRICATED PLUG FOR SPHERICAL PLUG VALVE

Filed Aug. 25, 1967    2 Sheets-Sheet 1

INVENTOR
MADDEN T. WORKS
BY
*James Jackson*
AGENT

Aug. 26, 1969  M. T. WORKS  3,463,450

FABRICATED PLUG FOR SPHERICAL PLUG VALVE

Filed Aug. 25, 1967  2 Sheets-Sheet 2

INVENTORS
MADDEN T. WORKS
BY *James E. Jackson*
AGENT

United States Patent Office 3,463,450
Patented Aug. 26, 1969

3,463,450
FABRICATED PLUG FOR SPHERICAL
PLUG VALVE
Madden T. Works, Houston, Tex., assignor to ACF Industries, Incorporated, New York, N.Y., a corporation of New Jersey
Filed Aug. 25, 1967, Ser. No. 663,936
Int. Cl. F16k 5/06, 5/20, 15/04
U.S. Cl. 251—309                                    9 Claims

ABSTRACT OF THE DISCLOSURE

A fabricated hollow generally spherical plug for spherical plug valves which has a tubular conduit extending diametrically through the spherical plug to form a flow passage and has a partition disposed within the spherical plug defining a plurality of pressure balancing chambers. Apertures are formed in the wall structure of the plug communicating exterior fluid pressure into the pressure balancing chambers to prevent collapse of the plug by external fluid pressure.

Background and description of the invention

This invention relates generally to valves and more specifically to spherical plug valves particularly of the larger variety which are employed for controlling the flow of fluid in pipelines and other large flow systems. The invention, however, is not intended as being limited to incorporation only in large valve structures. It will appear obvious from an understanding of the disclosure that my invention is applicable in spherical plug valves of virtually all sizes.

Fabricated lightweight spherical plug members, which are generally referred to in the valve industry as balls for ball valves, are considered desirable for a number of reasons. Fabricated ball structures because they are light in weight, as compared to solid metal balls, generally require less torque to induce rotation of the ball between open and closed positions. This low torque aspect is important not only from cost considerations, but it also has merit regarding the serviceability of ball valve and valve operator structures. The working parts of valves tend to be more serviceable when the torque forces required to open and close the valve are low. The low weight characteristic of fabricated balls also eliminates the requirement for excessively massive ball support and control elements, such as bearings, operating stems, and the like, thereby further reducing the overall weight of fabricated valves as compared to valves having solid plugs and promoting the low cost aspect of valve manufacture without sacrificing serviceability. Valves having fabricated ball members are generally deemed to be lower in cost than valves having solid spherical plugs primarily because of the difference in the volume of metal employed in the manufacture and because fabricated structures can be manufactured from readily available materials and by the employment of ordinary welding equipment. Plug support and control structures of valves having fabricated balls are generally more lightweight and less expensive than counterpart structures for valves having heavy solid ball structures, thereby further promoting the competitiveness of valves of this nature because plug support and control structures and operator requirements are generally lower in cost.

Fabricated ball structures are also preferable because the machining requirements are generally of lower cost as compared with forged or cast valve structures. Fabricated ball structures can be formed quite accurately, thereby requiring only a small amount of machining or sealing surface preparation to produce a high quality spherical sealing surface.

Fabricated plug structures have not been widely employed in the past in large valves primarily because of problems related to structural plug integrity. Plug structures which are fabricated from thin metal tend to collapse or deform excessively upon the application of external fluid pressures thereto and therefore such plug structures are ordinarily limited to pressure ranges which are quite low. Moreover, the cost of producing fabricated plug structures from relatively thick materials, capable of supporting high fluid pressure loads, generally results in excessively high plug cost because of problems encountered in forming the spherical shell member which defines the spherical surface of the ball.

A further aspect of fabricated valves which has hindered the development of fabricated ball structures is the difficulty of transmitting forces from the valve stem to the plug without developing forces sufficiently high in the area of the trunnions to yield the metal from which the valve is fabricated. Under high fluid pressures, initial movement of the ball to break the fluid seal frequently involves extremely high torque forces which may yield the structural material of the ball in the area of the trunnions.

Accordingly, it is a primary object of the invention to provide a novel fabricated ball for ball valves which employs lightweight fabricated construction and which is not subject to collapse or excessive yielding thereof by the forces developed by fluid pressure.

It is a further object of this invention to provide a novel fabricated valve ball construction including structure which effectively transmits torque forces applied to the ball throughout the structural elements of the plug to eliminate metal yielding forces in confined areas of the ball structure.

An even further object of this invention contemplates the provision of a novel fabricated valve ball construction which is light in weight, low in cost and reliable in use.

Other and further objects of this invention will become obvious upon an understanding of the illustrative embodiments about to be described or will be indicated in the appended claims, and various advantages not referred to herein will occur to one skilled in the art upon employment of the invention in practice.

A preferred embodiment of the invention has been chosen for purpose of illustration and description and is shown in the accompanying drawings forming a part of this specification wherein.

Figure 1:
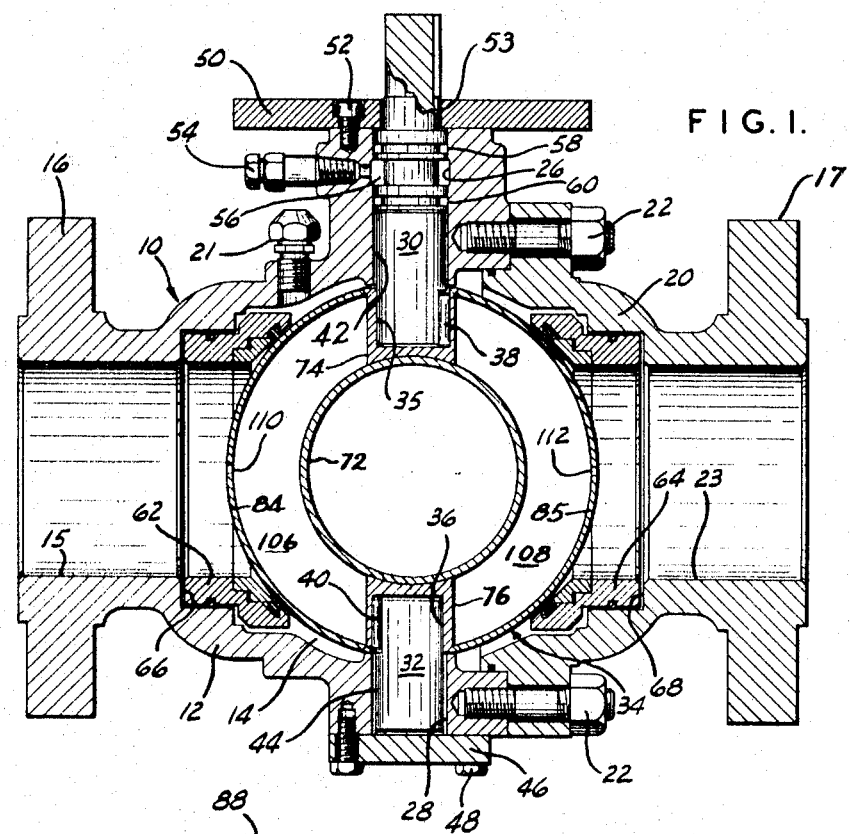
FIGURE 1 is an elevational view in section illustrating a spherical plug valve constructed in accordance with my invention.

Referring now to the drawings for a more complete understanding of the invention, a valve which may be an end entry spherical plug valve as illustrated at 10 in FIGURE 1 has a valve body portion 12 thereof defining a valve chamber 14. The valve body portion 12 of the valve 10 is formed with an inlet or outlet flow passage 15 in fluid communication with the valve chamber 14. The valve body may be provided with a flange structure shown at 16 in FIGURE 1, or it may be provided with a weld end construction for either bolted or welded connection of the valve 10 to a pipeline or other conduit structure. Other conventional methods of connection between the valve 10 and a pipeline such as threaded connection, for example, may be employed without departing from the spirit or scope of this invention. An end closure portion 20 of the valve 10 is retained in sealed assembly with the valve body portion 12 by a series of bolts or threaded studs 22 and defines a closure for the valve chamber. The end closure member 20 is formed with an inlet or outlet flow passage 23 which is disposed in axial alignment with the flow passage 15. The end closure member 20 may be provided with a flanged structure 17 for bolted connection thereof to a pipeline or other suitable connection structure may be employed within the spirit or scope of this invention. The valve body 12 may be provided with a pressure relief fitting 21 for bleeding body pressure to the atmosphere if desired.

The valve body 12 is formed with upper and lower aligned apertures 26 and 28, respectively, which receive upper and lower trunnion members 30 and 30 respectively therein. A substantially spherical plug member illustrated generally at 34 forms an important part of this invention, and will be discussed in detail hereinbelow. The plug member 34 is provided with upper and lower trunnion apertures 35 and 36, respectively, which receive the upper and lower trunnions 30 and 32 to maintain alignment of the spherical plug within the valve body. Upper and lower key members 38 and 40 are retained within interrelated slot structures formed within the plug members and trunnion members to provide nonrotatable connection between the trunnion and the spherical plug. If desired, the key structure for the lower trunnion 32 may be eliminated and the ball 34 may be disposed in rotatable relation to the lower trunnion. It is required only that there be a nonrotatable connection between the operating trunnion or stem 30 and the ball 34 for purpose of valve operation. Bearing sleeve members 42 and 44 are interposed between the trunnion members and the respective cylindrical trunnion bores in the valve body. A cover plate 46 which provides a closure and support plate for the trunnion aperture 28 is fixed to the valve body 12 by a series of bolts 48. An operator adapter plate 50 is connected by a series of cap screws 52 to the upper extremity of the valve body about the upper trunnion bore 26. The upper trunnion or stem 30 extends through an aperture 53 formed in the adapter plate. Any one of a number of commercially available power or manually actuated valve operator devices may be fixed to the adapter plate 50 in any desirable manner to provide mechanical means for imparting rotation to the upper trunnion member 30, and thereby to impart rotation to the spherical plug member between the open and closed positions thereof.

For establishing a seal between the upper trunnion or stem 30 and the valve body 12, a stem packing adapter 54 is connected to the valve body 12 by threading or the like. The packing adapter is utilized to force semisolid packing material into an annular packing chamber 56 defined about the valve stem 30. A pair of sealing members 58 and 60 are disposed on opposite sides of the packing chamber 56 within annular grooves formed in the stem 30 and serve to prevent escape of the packing material from the packing chamber through the stem aperture 26.

To establish a seal between the rotatable spherical plug member 34 and the valve body, a pair of annular seat assemblies 62 and 64 are retained respectively within annular seat pockets 66 and 68 formed about the flow passages 15 and 23. The seat assemblies include a sealing portion thereof of any desired configuration or material which is disposed for sealing engagement with the spherical working surface of the ball member 34. Sealing engagement between the sealing portion of the seat assemblies and the spherical working is maintained during rotational movement of the ball except for those ball positions where the seal is broken by the flow passage through the valve.

Figure 2:
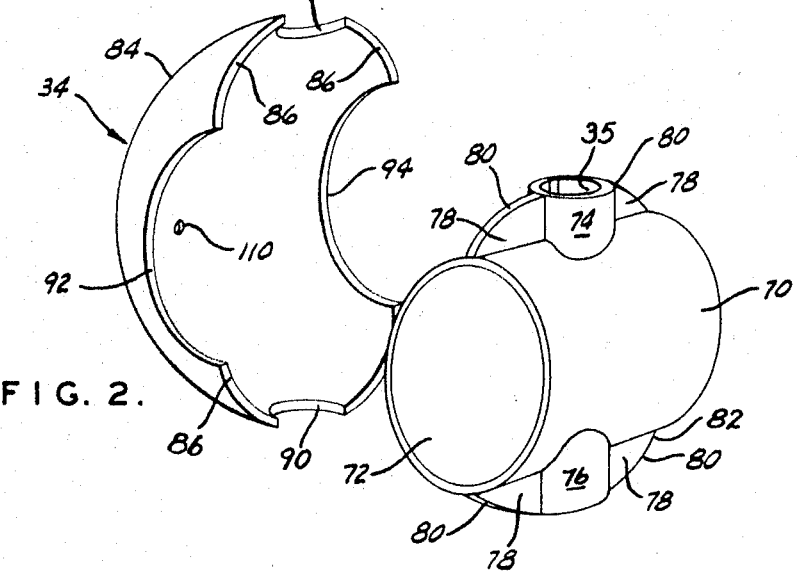
FIGURE 2 is an exploded view in perspective of the spherical plug or valve ball of the invention of FIGURE 1 illustrating the internal parts of a spherical plug as they appear during assembly thereof.

With reference now to FIGURE 2 which illustrates the internal parts of the plug in detail, the plug member is shown to comprise a generally tubular conduit 70, the internal walls of which define a flow passage 72. A pair of axially aligned trunnion bosses 74 and 76 are connected to the tubular conduit 70 by welding or the like and are disposed in substantially normal relationship with the longitudinal axis of the tubular conduit 70. As indicated above, the trunnions will be nonrotatably received within the trunnion apertures to provide for support of the ball and to provide for driving connection between the operating stem 30 and the ball structure. The trunnion boss members 74 and 76 may be provided in a cup-like configuration fixed to the tubular conduit 70 with the cup openings facing outwardly to provide trunnion apertures for receiving the trunnions 30 and 32. Alternatively, the trunnion boss members 74 and 76 may be provided in the form of solid substantially cylindrical structures which subsequent to fabrication of the spherical plug will be drilled and bored to provide trunnion apertures of proper configuration and alignment.

Figure 3:
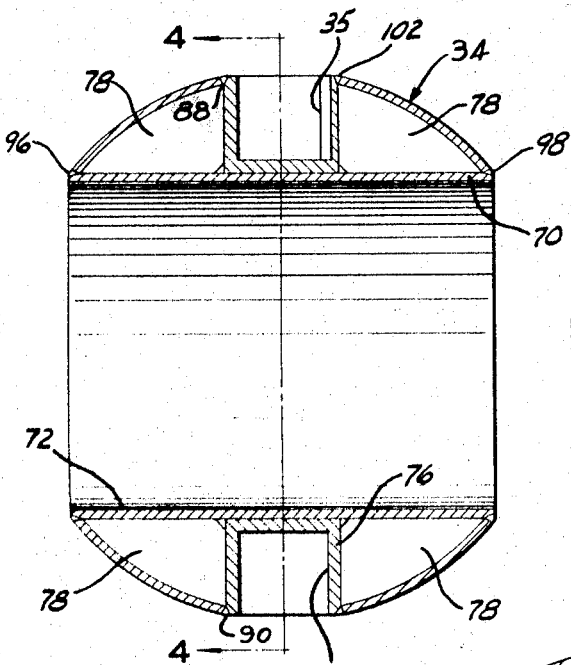
FIGURE 3 is a sectional view of the spherical plug of the invention of FIGURE 1.
Figure 4:
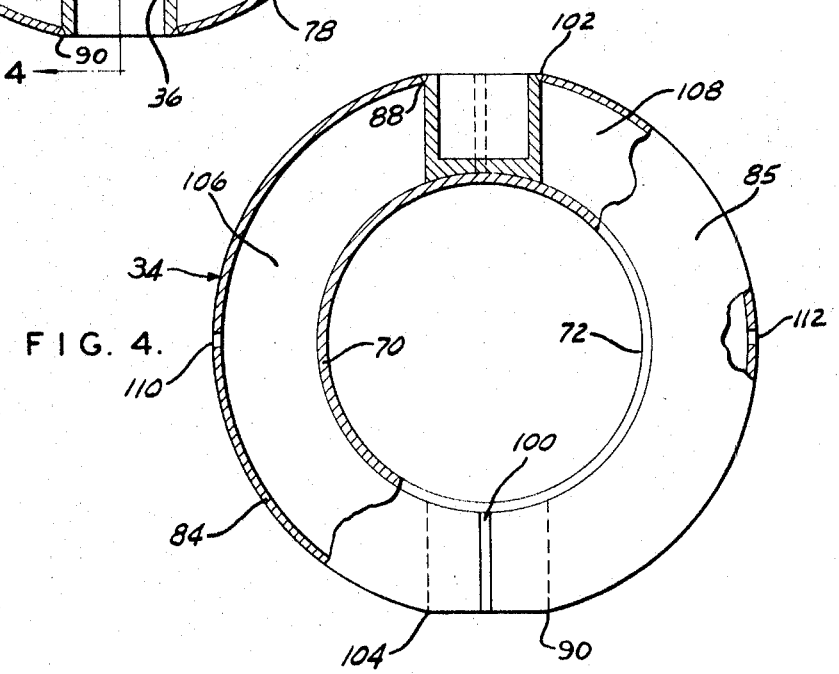
FIGURE 4 is an elevational view of the spherical plug of the valve of FIGURE 1 having parts thereof broken away and illustrated in a section taken along line 4—4 in FIGURE 3.

A plurality of structural segments 78 are fixed by welding or the like to the tubular conduit 70 and to the respective one of the upper and lower trunnion boss members 74 and 76. Each of the segments 78 is provided with an arcuate edge surface 80 which, in assembly with the conduit and trunnion structures, cooperates to define a partition 82 disposed in substantial alignment with the longitudinal axis of the tubular conduit 70. The partition divides the internal cavity of the ball into two pressure balancing chambers 106 and 108 which are discussed in detail hereinbelow. A pair of substantially identical generally hemispherical shells 84 and 85 are provided for connection to the tubular conduit, the trunnion bosses and the segment structure to define the substantially spherical exterior configuration of the plug member 34 as illustrated in FIGURES 3 and 4. Each of the hemispherical shells 84 and 85 is provided with four arcuate surfaces 86 defining segments of a circle. The curvature of the internal surface of the spherical shell is substantially identical to the curvature of the arcuate surfaces 80 of the segment members 78 to provide for intimate engagement therebetween. When the hemispherical shells 84 and 85 are placed in assembly with the conduit, trunnion and segment structures, the arcuate surfaces 86 of each of the hemispherical shells will be disposed in abutment or in juxtaposition one with the other and will also be in juxtaposed relation with the arcuate surfaces 80 of the segment members 78. This relationship effectively promotes interconnection of the structural elements of the valve ball 34 by circumferential welds.

The hemispherical shell members 84 and 85 are also provided with aligned upper and lower trunnion recesses 88 and 90 which are in juxtaposed relation with the respective upper and lower trunnion bosses 74 and 76, when in assembly. The hemispherical shell members 84 and 85 are also provided with a pair of semicircular conduit recesses 92 and 94 which are disposed in intimate contacting relationship with the exterior cylindrical surface of the tubular conduit 70 at the extremities thereof. The arcuate surfaces 88, 90, 92 and 94 are so shaped that they engage the adjacent plug structure in such manner as to define a welding groove of any desired configuration. One acceptable type of welding groove is shown in FIGURES 2 and 3.

Subsequent to assembly of the generally hemispherical shells 84 and 85 to the plug, trunnion and segment assembly, circular welds 96 and 98 are formed at the extremities of the conduit to integrally connect each of the hemispherical shells 84 and 85 with the tubular conduit 70. Four segmented circumferential welds 100 are formed about the circumference of the spherical shell which, in addition to interconnecting the hemispherical shells, also connects the arcuate surfaces 80 of the segments 78 to the inner peripheries of the hemispherical shells 84 and 85. Upper and lower circular welds 102 and 104 are then formed to connect the hemispherical shell structures to the trunnion bosses 74 and 76. Subsequent to fabrication of the spherical plug 34, the trunnion bosses 74 and 76 are machined to the proper dimension, alignment and surface configuration to receive the trunnions of the valve. After completion of the fabrication process, the generally spherical surface is subjected to light machining and surface preparation to provide a substantially spherical sealing surface of proper tolerance for sealing engagement with the seat members of the valve.

The interrelated structural reationship between the trunnion bosses, the partition segments, the tubular conduit, and the hemispherical shells presents a plug structure which is effective to evenly distribute torque forces applied to the trunnion members throughout the plug construction and thereby eliminate the possibility of development of excessively high force levels in confined areas of the plug structure which might otherwise cause deformation of the trunnion structures by yielding of metal in the area of the valve stem trunnion 30. Torque forces applied by the trunnion members to the spherical plug 34 will be distributed to the tubular conduit 70 through the partition segments 78 and will be transmitted both indirectly to the spherical outer shell through the partition segments 78 and tubular conduit 70 and directly to the spherical shell by virtue of the integral connection effected by the welds 102 and 104.

The partition 82 defined by the segments 78, and the trunnion bosses 74 and 76 cooperate with the substantially hemispherical shells and with the tubular conduit 70 to define a pair of enclosed pressure balancing chambers 106 and 108 as illustrated in FIGURE 4. Each of the hemispherical shells is provided with apertures 110 and 112 which communicate fluid under pressure into the pressure balancing chambers 106 and 108 respectively. This feature effectively develops a balanced pressure condition between the internal chambers 106 and 108 and the pressurized fluid controlled by the valve, thereby eliminating the possibility of pressure deformation of the spherical working surface of the plug 34. The pressure balancing feature therefore allows the hemispherical shells 84 and 85 to be formed from lightweight inexpensive material thereby promoting the competitive nature of the valve. Moreover, any requirement for internal shell support structures and/or for a thick pressure supporting shell is effectively eliminated since the crushing effect of fluid pressure is balanced and rendered ineffective by balanced internal fluid pressure.

It is necessary that the partition 82 be of sufficient strength to carry the full force of line pressure because it is contemplated that the upstream line in the closed position of the valve may be subjected to fluid pressure and the downstream line may be bled to the atmosphere. Under this condition, the area of the spherical plug surface which is disposed outwardly of the area of sealing contact with the upstream seat will be subjected to some pressure differential assuming that the fluid pressure within the valve chamber is different than the fluid pressure in the upstream line. This limited area of presure differential however will be insignificant and will not adversely affect the plug structure in any manner. Fluid pressure internally of the upstream pressure balancing chamber will also act through the surface area of the spherical plug outside of the sealing diameter of the seat members to effect a small pressure stressed area on the hemispherical shell structures. Likewise, the valve body pressure, if any, will act on the surface area of the plug member outside of the downstream sealing member to effect a negligible pressure stress on the spherical working surface.

It is not intended to limit the invention specifically to the plug construction illustrated in FIGURES 1 through 4. It should be clearly apparent that the invention is equally applicable to valve plug constructions of different exterior and interior structural configuration. For example, the invention is equally applicable to cylindrical and frusto-conical configured rotatable plug structures. The tubular conduit and partition structure may be provided in the form of an integral casting to which is welded hemispherical shells generally of the same configuration as set forth in FIGURE 2. As an alternate form of the invention, a pair of relatively thick partition structures may be welded to a tubular conduit and the trunnion apertures may be formed in the partition structures instead of being provided as separate structural boss elements as illustrated in FIGURE 2.

It is evident from the foregoing that I have provided a unique fabricated plug construction which is light in weight, as compared to solid plug structures, and yet which has sufficient structural integrity to prevent collapse or excessive yielding of the materials thereof by external pressure. This structural integrity is made possible by the provision of a structural partition which is formed on or affixed to a tubular conduit structure to define a flow passage and pressure barrier. The pressure balanced concept of my invention allows the utilization of relatively thin structural materials to form the outer generally spherical wall of the plug without involving the possibility of collapse of the spherical shell by fluid pressure. In fact, by using the pressure balanced concept of my invention the effect of fluid pressures on the exterior spherical shell can be substantially eliminated. The unique partition structure of my invention effectively provides a torque load transmitting core which serves to evenly distribute torque loads throughout the plug structure to prevent excessive deformation of the plug structure in the area of the trunnion members. As described above, torque forces will be transmitted directly by the trunnion members to the tubular conduit 70 and by virtue of welded connection between the trunnion members and the spherical shell will directly transmit torque forces to the spherical shell. Fabricated plug structures constructed in accordance with the spirit and scope of my invention further enhance the competitive nature of valves because such lightweight structures are not only less expensive to manufacture, but require less expensive control elements as compared to solid cast plug structures. Moreover, the low cost machineability of valve balls constructed in accordance with my invention further enhances the competitive nature of valves incorporating plug structure of this nature. It is evident therefore that my invention is one well adapted to attain all of the objects hereinabove set forth together with other advantages which will become obvious and inherent from a description of the apparatus itself.

I claim:

1. A valve having a valve body defining a valve chamber, said valve body having inlet and outlet passages in fluid communication with said valve chamber, a hollow enclosed plug member disposed within said valve chamber and being rotatable between open and closed positions thereof to control the flow of fluid through said inlet and outlet passages, said plug member having a wall therein disposed in transverse relation to said inlet and outlet passages in the closed position of said plug and dividing said plug into a pair of pressure balancing chambers, means communicating fluid presure from the exterior of said plug into each of said pressure balancing chambers, whereby in the closed position of said plug fluid pressure within one of said pressure balancing chambers is balanced with fluid pressure in the inlet passage and fluid pressure within the other of said pressure balancing chambers is balanced with the fluid pressure within said outlet passage.

2. A spherical plug valve having a body portion defining a valve chamber, said body portion defining flow passages in fluid communication with said valve chamber, a generally spherical plug member rotatably disposed within said valve chamber, means for imparting rotation to said plug member, seat means disposed within said valve and being disposed in sealing engagement with said plug member and with said body portion, said plug member being formed by a pair of substantially identical relatively thin hemispherical members having circumferential edges thereof in juxtaposed relation to define a hollow generally spherical shell, said hemispherical members cooperating to define a pair of aligned conduit openings, a tubular conduit extending diametrically through said generally spherical shell and defining a flow passage through said plug member, a partition disposed within said plug member exteriorly of said tubular conduit and dividing the interior of said plug member into a pair of pressure balancing chambers, means communicating fluid pressure into each of said pressure balancing chambers, whereby fluid pressure within each of said pressure balancing chambers will be balanced with fluid pressure exteriorly of each of said pressure balancing chambers.

3. A spherical plug valve as set forth in claim 2, said means communicating fluid pressure into said pressure balancing chambers comprising ports formed in each of said hemispherical members, said ports being disposed in fluid communication with said flow passages in the closed position of said plug member.

4. A substantially spherical plug member for plug valves, as set forth in claim 3, said ports being adapted to align one with each of the flow passages in the closed position of the plug member.

5. A spherical plug valve as set forth in claim 2, said partition being connected to said tubular conduit and defining a plane which is substantially aligned with the longitudinal axis of said tubular conduit.

6. A spherical plug valve as set forth in claim 5, upper and lower trunnion structures being fixed to said tubular conduit and aligned in substantially normal relation to the longitudinal axis of said tubular conduit, a plurality of segment structures being fixed to said tubular conduit to said trunnions and to said substantially spherical shell, said segment structures cooperating with said trunnion structures to define said partition.

7. A substantially spherical plug member for spherical plug valves comprising a relatively thin shell defining a substantially spherical hollow structure, a tubular conduit extending diametrically through said shell and defining a flow passage through said plug, a partition disposed within said shell and dividing said hollow shell into a pair of pressure balancing chambers, means communicating fluid pressure into each of said pressure balancing chambers, whereby fluid pressure within each of said chambers will be balanced with fluid pressure exteriorly of said chambers.

8. A substantially spherical plug member for spherical plug valves, as set forth in claim 7, said means communicating fluid pressure into each of said pressure balancing chambers comprising ports formed in a wall of each of said pressure balancing chambers whereby fluid under pressure exteriorly of said chambers will be communicated to said chambers through said ports to balance the internal pressure of said chambers with said pressure exteriorly of said chambers.

9. A substantially spherical plug member for spherical plug valves, as set forth in claim 7, a pair of axially aligned trunnion members fixed to said tubular conduit and being disposed in substantially normal relation to the longitudinal axis of said tubular conduit, a plurality of segment structures fixed to said tubular conduits said trunnion members and said shell and cooperating to define said partition.

References Cited
UNITED STATES PATENTS

| | | | |
|---|---|---|---|
| 2,799,467 | 7/1957 | Hedene | 251—124 |
| 2,979,071 | 4/1961 | Herring et al. | 251—315 X |
| 3,213,876 | 10/1965 | Manton | 137—340 |
| 3,343,802 | 9/1967 | Schuilwerve | 251—175 |

FOREIGN PATENTS

| | | |
|---|---|---|
| 397,137 | 2/1921 | Germany. |

M. CARY NELSON, Primary Examiner

M. O. STURM, Assistant Examiner